United States Patent [19]

Gaenzler et al.

[11] 3,907,882

[45] Sept. 23, 1975

[54] METHOD FOR THE OXYCARBONYLATION OF ETHYLENE AND PROPYLENE

[75] Inventors: Wolfgang Gaenzler, Darmstadt-Eberstadt; Klaus Kabs, Seeheim; Guenter Schroeder, Ober-Ramstadt, all of Germany

[73] Assignee: Rohm GmbH, Darmstadt, Germany

[22] Filed: Mar. 29, 1974

[21] Appl. No.: 456,312

Related U.S. Application Data

[63] Continuation-in-part of Ser. No. 372,695, June 22, 1973, abandoned.

[30] Foreign Application Priority Data

June 30, 1972 Germany............................. 2232088

[52] U.S. Cl............................................. 260/533 A
[51] Int. Cl.² ....................C07C 51/14; C07C 57/04; C07C 57/08
[58] Field of Search................................ 260/533 A

[56] References Cited
UNITED STATES PATENTS 2,739,169  3/1956  Hagemeyer..................... 260/533 A

OTHER PUBLICATIONS

Fenton et al., Chem Tech., April 1972, pp. 220–225.

Davenport et al., I & E. C., 60, No. 11, Nov. 1968, pp. 10–19.

*Primary Examiner*—Anton H. Sutto
*Assistant Examiner*—Richard D. Kelly
*Attorney, Agent, or Firm*—Curtis, Morris & Safford

[57] ABSTRACT

An improved method for the oxycarbonylation of ethylene and propylene to form $\alpha, \beta$-unsaturated carboxylic acids, which method employs a catalyst consisting essentially of a rhenium compound and, as a co-catalyst, at least one member selected from the group consisting of compounds of metals of the second and third main groups of the Periodic System, compounds of metals and the fourth, fifth, and sixth sub-groups of the Periodic System, and compounds of manganese, iron, and copper.

8 Claims, No Drawings

METHOD FOR THE OXYCARBONYLATION OF ETHYLENE AND PROPYLENE

This application is a continuation-in-part application of copending application Ser. No. 372,695 filed June 22, 1973 and now abandoned.

The present invention relates to a process for the preparation of $\alpha,\beta$-unsaturated carboxylic acids by the oxidative carbonylation of ethylene and propylene in the presence of a catalyst system comprising rhenium and a co-catalyst.

It is known in the art to prepare unsaturated carboxylic acids by the oxycarbonylation of olefins. In this process, carbon monoxide and oxygen are reacted at an elevated temperature with an olefin in a non-aqueous medium. In the process, a salt or a soluble complex of a platinum metal catalytically promotes the reaction. Among the platinum metals, palladium and its compounds have proved to be particularly effective catalysts.

U.S. Pat. No. 3,381,030 describes a process for the oxycarbonylation of olefins. Since water is formed in the course of side reactions and leads to disruption of the process, water-absorbing agents are employed in the aforementioned oxycarbonylation. Acid anhydrides and chlorides, as well as ketene, have proved useful as such agents.

According to U.S. Pat. No. 3,621,054, molecular sieves comprising aluminum silicates (for example, those prepared according to U.S. Pat. Nos. 2,882,243 and 2,882,244) have proved useful as dehydrating agents in such processes.

The catalytic efficacy of the platinum metal or of the salts of this metal are considerably improved by the co-use of a redox metal. According to U.S. Pat. No. 3,397,226, copper has proved particularly useful as a polyvalent metal which, together with a compound of a platinum group metal such as a palladium salt, forms a catalyzing redox system.

According to U.S. Pat. No. 3,415,871, iron salts are useful for the same purpose.

Aforementioned U.S. Pat. No. 3,397,226 further teaches that the oxycarbonylation of olefins can also be carried out in a non-aqueous alcohol and that, by this process, esters of the corresponding unsaturated carboxylic acid are formed.

D. M. Fenton and K. L. Olivier, who are named as patentees in many of the aforementioned patents, have written a summary article concerning oxycarbonylation in the presence of platinum metals as catalysts in Chemtech, 220 – 225 (April 1972). As the result of an intensive ten-year research program, Fenton and Olivier have determined that the oxycarbonylation of olefins proceeds most advantageously in the presence of a redox system comprising a palladium salt and a copper salt.

According to the present invention, it has been found that the process of oxidative carbonylation of olefins under the influence of a catalyst system can be carried out in the presence of a catalyst system comprising a rhenium compound as the catalyst and, as a co-catalyst, at least one compound of a metal of the second or third main groups (i.e., of Be, Mg, Ca, Sr, Ba, Ra, B, Al, Ga, In, Tl) or of the fourth to sixth sub-groups (i.e. of Ti, Zr, Hf, V, Nb, Ta, Cr, Mo, W) of the Periodic System, or a compound of manganese, copper, or iron. A compound of lithium or of tin may optionally be additionally present as a co-catalyst. These new catalyst systems, on the one hand, permit the desired reaction to proceed wit a high selectivity and, on the other hand, can be particularly easily prepared — in contrast to a contact system containing a platinum metal. Finally, the lack of sensitivity of these new catalysts to contact poisons, particularly to phosphorus, arsenic, and sulfur, should be emphasized.

The catalytic effect of rhenium and of compounds of metals of the seventh subgroup of the Periodic System is known in a variety of chemical processes. Catalysts comprising rhenium compounds are used as hydrogenation catalysts, for example in the conversion of carboxylic acids into alcohols, and in hydroformylation, i.e., in the addition of carbon monoxide and hydrogen to olefins. Also, in the gas phase oxidation of olefins, for example in the direct oxidation of propylene to acrylic acid with intermediate formation of acrolein, or in the oxidation of propylene and ammonia to form acrylonitrile, the efficacy of the preferred catalysts, which principally comprise bismuth-phosphomolybdates, can be significantly improved by the incorporation of rhenium oxide. Finally, reference is made to the use of rhenium-containing catalysts in cracking processes. Davenport et al. have reported in Industrial and Engineering Chemistry 60, 11 (November 1968) on the aforementioned processes promoted by rhenium and about further chemical reactions in which rhenium compounds take part as catalysts (e.g., in the polymerization of styrene and other vinyl compounds under the influence of rhenium chloride).

The heart of the present invention, that redox systems comprising rhenium are outstanding catalysts for the oxycarbonylation of ethylene and propylene, is novel in the light of the aforementioned state of the art.

As compounds of rhenium, the halides, such as the chloride, bromide, iodide, and fluoride, particularly rhenium (III) halides; the carboxylates, such as rhenium acetate; the alkali perrhenates; and rhenium heptoxide are employed. If rhenium compounds are used in which rhenium is present as a hexavalent or heptavalent element, the reduction of these compounds to lower oxidation states of rhenium is necessary. As the reducing agent, tin (II) chloride or iron compounds are suitable.

The catalyst combination — rhenium compound and co-catalyst compound or compounds — is suitably used in an amount from 0.01 to 5 percent, by weight of the non-aqueous reaction medium. Within the combination, the metal or metals of the co-catalyst are present in at least the same molar amount as the rhenium metal, and may be present in quite considerable excess.

Of the co-catalysts to be used according to the present invention, compounds of copper, calcium, magnesium, aluminum, vanadium, iron, titanium, zirconium, niobium, tantalum, chromium, molybdenum, tungsten, and manganese, are mentioned as preferred materials by way of example. Compounds of these metals and the other aforementioned metals, particularly in the form of their halides, sulfates, carboxylates, oxides, or complex salts, can be used as co-catalysts alone or in admixture with another. It must be considered surprising that — in contrast to palladium-containing co-catalyst systems —, the metal effective as a co-catalyst need not be a metal that occurs in plural oxidation states. From the examples given later herein, it can be seen that a catalyst system comprising a rhenium compound and an aluminum salt, optionally in the form of a complex compound, is effective in catalytically promoting the oxycarbonylation of an olefin in an outstanding fashion.

The additional presence of alkali carboxylates soluble in the reaction medium, such as sodium- or lithium-acetate, has proved particularly advantageous, but is not critical to the success of the process of the invention. Whether the observed improvement of the oxycarbonylation when carboxylates are employed is attributable solely to their buffer action toward hydrochloric acid released during the reaction from, for example, $CuCl_2$ or $ReCl_3$, or whether these carboxylates form particularly effective catalytic complex compounds with rhenium, cannot yet be determined with certainty.

The oxycarbonylation of ethylene and/or propylene according to the present invention is carried out in a nonaqueous medium which simultaneously must be a solvent for the catalyst system. As solvents in which the reaction according to the present invention can be carried out, carboxylic acids, and among these particularly acetic acid and propionic acid, are of principal interest. These acids, to be sure, are not completely inert to the olefins under the conditions of the oxycarbonylation and form β-acyloxy compounds therewith. These compounds, however, can be readily pyrolyzed, whereby the corresponding ethylene carboxylic acid is cleaved off and the saturated carboxylic acid can be returned to the reaction.

In addition to the aforementioned acids, there are a large number of other organic liquids suitable as solvents which have a sufficient solvent power for the catalyst employed and which are inert to the oxidative carbonylation. Examples of such solvents include dimethyl formamide, acetone, methyl ethyl ketone, cyclohexanone, ethyl acetate, amyl acetate, oxalic acid diethyl ester, and diethyl phthalate. Since the solvents in question are either completely or substantially completely inert media in which the reaction of the present invention occurs, a choice among them has no particular patentable significance. The use of solvents other than those mentioned by way of example is to be considered within the scope of the present invention.

The oxycarbonylation according to the present invention, as already described, takes place in a nonaqueous medium. Small amounts of water can arise by side reactions, for example in the formation of vinyl acetate from ethylene. Since the water, in turn, leads to undesired side reactions, for example to the formation of propionic, isobutyric acid, or n-butyric acid, the further use of a water-absorbing agent in the reaction medium is useful. If water-absorbing agents which bind water by way of a chemical reaction are employed, then it is advantageous to choose such agents which, by combination with water, form the corresponding reaction medium employed. For example, when acetic acid is used as the reaction medium, it is advantageous to employ acetic acid anhydride or ketene as water-binding agents; propionic acid chloride or anhydride are employed when propionic acid is the reaction medium. The aforementioned molecular sieves, used in the oxycarbonylation of olefins in the presence of redox systems comprising palladium, can also be used in the present invention as water-absorbing agents.

Reference has already been made to the advantage that the catalyst of the present invention can be prepared in a simple way. In particular, the relatively expensive rhenium can be recovered from the catalyst. By way of further explanation, it is pointed out that although the catalyst systems in question are robust and long-lived, they must be renewed from time to time. For this purpose, the rhenium compound present in the spent catalyst, optionally with other metal compounds acting as co-catalysts, is reduced with hydrogen to metallic rhenium. The latter is then oxidized by the passage of air thereover at temperatures of about 160°C. In this manner, the rhenium heptoxide formed sublimes. This can be converted to a soluble and highly catalytically effective complex by combination with, for example, copper chloride and tin (II) chloride.

A further method for preparing the catalyst comprises converting the metallic rhenium obtained by reduction with hydrogen to rhenium chloride at temperatures of about 400°C. by passing chlorine thereover. The chloride sublimes at these temperatures. The red to dark-violet product which separates in the cooled receiver is a mixture of rhenium trichloride with small amounts of rhenium pentachloride. This product can be used for the preparation of a new catalyst batch and, for example, is readily soluble in glacial acetic acid.

In contrast to the simple preparation of the catalyst according to the present invention, which results in extraordinarily small losses of rhenium, the preparation of catalysts in which palladium is present in salt form or complex form is a roundabout and expensive process.

In the oxycarbonylation of ethylene according to the process of the invention, as shown in the following examples in detail, acrylic acid is obtained in high yield. In the reaction of propylene, the corresponding reaction product is a mixture of crotonic acid and methacrylic acid.

As shown in the following examples, the selectivity of the catalyst system of the invention varies with respect to the formation of methacrylic acid or of crotonic acid. Although crotonic acid and its esters are of lesser significance when compared with methacrylic acid and its esters, nevertheless crotonic acid is used as a comonomer, for example in minor amounts in the preparation of copolymers of vinyl acetate.

The oxidative carbonylation of ethylene and propylene is an exothermic reaction which is carried out at temperatures between 30°C. and 300°C., advantageously between 80°C. and 200°C. Pressure favors the reaction since the concentration of the reagents in the reaction medium is increased by the use of pressure. Although the formation of acrylic acid or crotonic acid and methacrylic acid is observed at normal pressures when correspondingly high temperatures are employed, the use of an elevated pressure is indispensable for carrying out the process on a technical scale. Pressures between 10 and 120 atmospheres are advantageously used, although pressures up to 200 atmospheres and more can be employed.

Although the process of the invention is shown in the following examples as carried out in a discontinuous fashion, it is also possible to carry out the process continuously, for example in a pressure tube. The ratio of the reagents, namely olefin, CO, and $O_2$, can be a stoichiometric one but, nevertheless, can also deviate from theoretical values.

A better understanding of the present invention and of its many advantages will be had by referring to the following specific examples given by way of illustration.

The following is common to all of the examples: the reaction medium, with or without acetic acid anhydride as a water-absorbing agent, is placed in a "Teflon"-coated heatable one-liter autoclave. The catalyst-forming salt mixture is introduced into the reaction medium and the autoclave is closed. Then the olefin is first introduced into the autoclave under pressure. Ethylene, as is detectable by the rapid decrease in pressure, is dissolved in the glacial acetic acid employed, while propylene — because of its liquefaction at pressures of more than about 10 atmospheres — must be compressed several times in order to saturate the reaction medium with this olefin. Then, carbon monoxide and oxygen or air, respectively, are introduced under pressure and the autoclave is heated to a temperature of 100°C – 160°C. On reaching the aforementioned temperature, exothermic reaction sets in, as is detectable from an increase in temperature to about 160°C. – 170°C. The pressure in the autoclave is raised by this temperature increase to about 60 atmospheres.

The contents of the autoclave are worked up by distillation. In the oxycarbonylation of ethylene, the acrylic acid formed distills at a head temperature of 140°C. In the reaction of propylene, the crotonic acid and methacrylic acid formed can be drawn off in vacuum at a temperature between 80°C. and 100°C. The crotonic acid solidifies in the cooled receiver (m.p. = 72°C.). The reaction products formed are analyzed gas chromatographically, by determination of the bromine number, by infrared spectrography, and by the nuclear magnetic resonance spectrum in conventional fashion.

EXAMPLE 1

1.0 g $ReCl_3$, 5 g of $CuCl_2$, and 15 g of sodium acetate were dissolved in 500 ml of glacial acetic acid. Thereafter, 40 atmospheres of ethylene, 40 atmospheres of carbon monoxide, and 20 atmospheres of oxygen were introduced under pressure and the autoclave was heated to 110°C. The exothermic reaction was concluded after a few minutes. After cooling the autoclave, the contents were worked up as described above. In this manner, the following were obtained:

38.9 g of acrylic acid;
6.3 g of β-acetoxypropionic acid (from which a further 3.9 g of acrylic acid can be won by pyrolysis);
7 g of propionic acid.

EXAMPLE 2

As in Example 1, 0.5 g $ReCl_3$, 5 g $CuCl_2$, and 10 g of sodium acetate were dissolved in 500 ml of glacial acetic acid to which 5 ml of acetic acid anhydride were added. Thereafter, 60 atmospheres of ethylene, 20 atmospheres of CO, and 20 atmospheres of oxygen were introduced under pressure. The autoclave was heated to 100°C. and cooled after the conclusion of the reaction. Working up of the contents of the autoclave gave:

37.3 g of acrylic acid;
2.0 g of β-acetoxy propionic acid;
1.95 g of propionic acid.

EXAMPLE 3

0.5 g of $ReCl_3$, 5 g of aluminum acetate, and 5 g of sodium acetate were dissolved in 300 ml of glacial acetic acid to which 25 ml of acetic anhydride had been added. Then 30 atmospheres of ethylene, 30 atmospheres of CO, and 10 atmospheres of oxygen were introduced under pressure and the autoclave was heated to 105°C. 20.6 g of acrylic acid and traces of propionic acid were formed.

EXAMPLE 4

1 g of rhenium heptoxide, 5 g of copper (II) chloride, 10 g of tin (II) chloride, and 15 g of sodium acetate were added to 450 ml of acetic acid and 50 ml of acetic anhydride. 70 atmospheres of CO, 20 atmospheres of $O_2$, and 10 atmospheres of propylene were introduced thereafter under pressure. Heating and working up of the reaction product followed as in the previous Examples. In this fashion were obtained:

17.67 g of crotonic acid and
1.21 g of methacrylic acid.

EXAMPLE 5

0.5 g of rhenium (V) chloride, 5.0 g of aluminum chloride, 5.0 g of lithium chloride, and 10 g of sodium acetate were dissolved in 300 ml of acetic acid and 25 ml of acetic anhydride. By the introduction of propylene under pressure three times, the reaction medium was saturated with this olefin. Then 80 atmospheres of CO and 20 atmospheres of $O_2$ were introduced under pressure and the autoclave was warmed to 110°C. Working up gave:

8.3 g of crotonic acid and
5.26 g of methacrylic acid.

EXAMPLE 6

5 g of aluminum chloride, 5 g of lithium chloride, and 10 g of sodium acetate were added to the catalyst residue of Example 5. The system was again saturated with propylene. After the introduction of 80 atmospheres of CO and 20 atmospheres of oxygen, the autoclave was warmed to 110°C. Working up gave:

20.7 g methacrylic acid and
8.8 g crotonic acid.

EXAMPLE 7

0.5 g of rhenium (V) chloride, 5.0 g of iron (III) chloride, and 15.0 g of sodium acetate were dissolved in 450 ml of acetic acid and 50 ml of acetic anhydride. The reaction medium was saturated with propylene by the introduction of propylene into the vessel three times under pressure. Thereafter, 80 atmospheres of CO and 20 atmospheres of $O_2$ were introduced under pressure and the autoclave was warmed to 110°C. Working up gave:

10.0 g of methacrylic acid and
7.5 g of crotonic acid.

EXAMPLE 8

0.25 g of rhenium (III) chloride, 5 g of copper (II) chloride, and 15 g of sodium acetate were dissolved in 450 ml of glacial acetic acid and 50 ml of acetic anhydride. After saturation of the reaction medium with propylene at room temperature, a further 10 atmospheres of propylene, 90 atmospheres of CO, and 20 atmospheres of $O_2$ were introduced under pressure. After heating of the autoclave to 100°C. the reaction set in vigorously. On working up the content of the autoclave as in the previous Examples, the following were obtained:

39.9 g of crotonic acid and
3 g of methacrylic acid.

EXAMPLE 9

As a comparison test, the oxycarbonylation of propylene according to Example 8 was repeated. However, in place of 0.25 g of rhenium chloride, 0.25 g of palladium chloride were employed. In order to convert the palladium compound into a soluble complex, 5 g of lithium chloride were additionally employed. The remaining conditions of the experiment were identical with those of Example 8.

On working up the contents of the autoclave in the manner already described, 11.8 g of crotonic acid;
0.96 g of methacrylic acid; and
2.7 g of acetoxybutyric acid were isolated. (By pyrolysis of the β-acetoxy butyric acid, a further 1.8 g of crotonic acid are formed.) In comparison with a yield of 39.9 g of crotonic acid and 3 g of methacrylic acid according to Example 4, the palladium catalyst under otherwise equal conditions gave a crotonic acid yield of 13.6 g and a methacrylic acid yield of about 1 g. It is worthy of note that the ratio of crotonic acid to methacrylic acid of about 13.1 is the same in both cases.

EXAMPLE 10

3.0 g of acetyl acetone are dissolved in 25 ml of glacial acetic acid and 2.9 g of rhenium (III) chloride and 1.1 ml of titanium (IV) chloride are added to this solution. After one day, 2.5 g of red crystals are separated by filtration and are dissolved in a mixture of 450 ml of glacial acetic acid and 50 ml of acetic anhydride.

After saturation of the reaction solution with propylene, the propylene pressure is adjusted to 10 atmospheres and 80 atmospheres of carbon monoxide and 20 atmospheres of oxygen are added. The autoclave is heated to 160°C. At this temperature the pressure starts to drop and reaches 90 atmospheres at room temperature.

2.0 g of methacrylic acid and 15.0 g of crotonic acid are isolated by distillation.

EXAMPLE 11

1 g of rhenium (III) chloride, 0.5 g of gallium (III) chloride, and 5.0 g of lithium acetate are dissolved in 500 ml of glacial acetic acid and 50 ml of acetic anhydride. After saturation with propylene, 80 atmospheres of carbon monoxide and 20 atmospheres of oxygen are introduced under pressure and the system is heated to 137°C.

3.2 g of crotonic acid and 0.5 g of methacrylic acid are recovered by distillation.

EXAMPLE 12

0.25 g of rhenium (III) chloride are dissolved together with 1 g of manganese (II) chloride and 5 g of sodium acetate in 500 ml of glacial acetic acid and 50 ml of acetic acid anhydride. This solution is saturated with propylene. Then 40 atmospheres of carbon monoxide and 20 atmospheres of oxygen are introduced under pressure and the system is heated to 130°C.

1.5 g of crotonic acid and 0.5 g of methacrylic acid are recovered on working up.

EXAMPLE 13

1.5 g of a mixture of rhenium (III) chloride and rhenium (V) chloride are dissolved together with 2 g of vanadium (III) chloride in 500 ml of glacial acetic acid and 50 ml of acetic anhydride. The solution is saturated with propylene. Then, 40 atmospheres of carbon monoxide and 25 atmospheres of compressed air are introduced and the system is heated to 150 °C. On working up, 0.8 g of methacrylic acid and 0.8 g of crotonic acid are found. In addition, a small amount of β-acetoxy-n-butyric acid is obtained.

EXAMPLE 14

1 g of a mixture of rhenium (III) chloride and rhenium (V) chloride are dissolved together with 2 g of chromium (III) bromide in 500 ml of glacial acetic acid and 50 ml of acetic acid anhydride and treated as in the previous Example. On working up, 0.5 g of methacrylic acid, 1.1 g of vinyl acetic acid, and 1 g of crotonic acid are obtained.

EXAMPLE 15

0.5 g of rhenium (III) chloride and 2 g of magnesium chloride are used as a catalyst in the same manner as in Examples 13 and 14.

0.3 g of methacrylic acid and 2.3 g of crotonic acid are obtained.

EXAMPLES 16 –

Proceeding again as in Example 13, runs were made with a variety of different catalysts. The catalysts and the products obtained are reported in the Table below.

| Number | Catalyst Components (in g) | Products (in g) |
|---|---|---|
| 16 | $1HfCl_4$, $1ReCl_3$ | 2.3 vinyl acetic acid<br>0.5 methacrylic acid |
| 17 | $2TaCl_5$, $1ReCl_3$ | 1.5 crotonic acid<br>0.3 methacrylic acid |
| 18 | $1WOCl_4$, $1ReCl_3$ | 2.1 crotonic acid<br>0.5 methacrylic acid |
| 19 | $5CaCl_2$, $2ReCl_3$ | 0.8 crotonic acid |

What is claimed is:

1. In the method for preparing α,β-unsaturated carboxylic acids by the oxidative carbonylation of ethylene, propylene, or mixtures thereof with oxygen and carbon monoxide, in a substantially non-aqueous reaction medium, under pressure, at an elevated temperature, and in the presence of a catalytic amount of a catalyst soluble in said non-aqueous medium, the improvement wherein said catalyst consists essentially of a rhenium compound and, as a co-catalyst, at least one member selected from the group consisting of compounds of metals of the second and third main groups of the Periodic System, the fourth to sixth sub-groups of the Periodic System, and compounds of manganese, copper, and iron.

2. A method as in claim 1 wherein said co-catalyst is a compound of a metal selected from the group consisting of magnesium, calcium, aluminum, gallium, titanium, hafnium, vanadium, tantalum, chromium, tungsten, manganese, copper, and iron.

3. A method as in claim 1 wherein said co-catalyst is a compound of a multivalent metal.

4. A method as in claim 1 wherein said co-catalyst is an aluminum compound.

5. A method as in claim 1 wherein said catalyst consists essentially of a rhenium (V) salt and an aluminum compound.

6. A method as in claim 1 wherein an alkali metal carboxylate is additionally present.

7. A method as in claim 6 wherein said alkali carboxylate is a carboxylate of sodium or lithium.

8. A method as in claim 1 wherein ethylene is converted to acrylic acid.

* * * * *